US006830169B1

United States Patent
Campbell

(10) Patent No.: US 6,830,169 B1
(45) Date of Patent: Dec. 14, 2004

(54) QUICK RELEASE SADDLEBAG MOUNTING SYSTEM

(76) Inventor: Garry L. Campbell, N1348 Fawn Ridge Ct., Greenville, WI (US) 54942

( * ) Notice: Subject to any disclaimer, the term of this patent is extended or adjusted under 35 U.S.C. 154(b) by 0 days.

(21) Appl. No.: 10/629,195

(22) Filed: Jul. 29, 2003

Related U.S. Application Data

(60) Provisional application No. 60/404,552, filed on Aug. 20, 2002.

(51) Int. Cl.[7] .................................................. B62J 9/00
(52) U.S. Cl. ....................... 224/413; 224/419; 224/431; 224/448; 224/450
(58) Field of Search ................................ 224/412, 413, 224/417, 419, 425, 431, 430, 448, 450; 280/288.4; 296/37.1

(56) References Cited

U.S. PATENT DOCUMENTS

| | | | | | |
|---|---|---|---|---|---|
| 2,553,739 A | * | 5/1951 | Ashdowne | .................. | 224/413 |
| 4,353,490 A | * | 10/1982 | Jackson et al. | ............. | 224/430 |
| 4,402,439 A | * | 9/1983 | Brown | ....................... | 224/417 |
| 5,810,230 A | * | 9/1998 | Nutto | ......................... | 224/417 |
| 6,053,384 A | * | 4/2000 | Bachman | .................... | 224/413 |
| 6,293,450 B1 | * | 9/2001 | Aron | .......................... | 224/430 |
| 6,318,756 B1 | * | 11/2001 | Papandreou | ................ | 280/775 |
| 6,354,476 B1 | * | 3/2002 | Alderman | ................... | 224/413 |
| 6,499,638 B2 | * | 12/2002 | Campbell | ................... | 224/430 |

* cited by examiner

*Primary Examiner*—Gary E. Elkins
(74) *Attorney, Agent, or Firm*—Donald J. Ersler

(57) ABSTRACT

A quick release saddlebag mounting system preferably includes two mounting assemblies, two mounting brackets and two mounting bolts. Each mounting assembly includes a cam, a driving handle, and at least one plate. The cam is retained in the at least one plate. The driving handle is attached to the cam with any suitable process. A hole is formed through the at least one plate to slidably receive a single mounting bolt. Each mounting assembly is preferably attached to a side of a saddlebag with a mounting bracket. Each mounting bolt is attached to a fender or mounting structure of a motor vehicle. The two mounting bolts are located to be received by the holes of the two mounting assemblies. To attach the saddlebag to the motor vehicle, the cam in each mounting assembly is rotated until the cam is firmly engaged with the cam spindle.

20 Claims, 4 Drawing Sheets

QUICK RELEASE SADDLEBAG MOUNTING SYSTEM

CROSS-REFERENCES TO RELATED APPLICATIONS

This is a utility application, taking priority from provisional patent application Ser. No. 60/404,552 filed on Aug. 20, 2002.

BACKGROUND OF THE INVENTION

1. Field of the Invention

The present invention relates generally to saddlebags and more specifically to a quick release saddlebag mounting system, which enables a saddlebag to be firmly attached to a motorcycle, motor vehicle, or the like without rattling.

2. Discussion of the Prior Art

There are several different methods of attaching a saddlebag to a motorcycle. One method of attaching a saddlebag to a motorcycle uses fasteners. However, tools must be used to remove fasteners. U.S. Pat. No. 6,053,384 to Bachman discloses a mounting system for motorcycle saddle bags. A rigid backing plate with a pair of mounting brackets are retained on a pair of keepers by tightening a fastener with a hand tool. However, using a hand tool to tighten a fastener is not a quick release device. Further, the saddle bag may not be locked on to the motorcycle. U.S. Pat. No. 6,293,450 to Aron discloses a quick release mechanism for motorcycle saddlebag. A mounting bracket is attached to an outside of the saddlebag. The mounting bracket is attached to the motorcycle at three different places with removable pins.

Accordingly, there is a clearly felt need in the art for a quick release saddlebag mounting system which allows a saddlebag to be firmly secured to a motorcycle without rattling; allows the saddlebag to be locked to the motorcycle; allows the saddlebag to be attached to the motorcycle without tools; and allows the saddlebag to be removed from the motorcycle without tools.

SUMMARY OF THE INVENTION

The present invention provides a quick release saddlebag mounting system, which enables a saddlebag to be firmly secured to a motorcycle or the like without rattling. A quick release saddlebag mounting system preferably includes at least one mounting assembly, at least one mounting bracket and at least one mounting bolt. Each mounting bolt preferably includes a retention bolt, a cam spindle, a spacer and a nut. The cam spindle includes a groove for receiving a thickness of a cam. Each mounting assembly includes a cam, a driving handle, and at least one plate. The driving handle is attached to the cam with any suitable process. The cam includes an inclined surface and a spindle clearance area. A cam plate includes a cam clearance opening and a cam spindle clearance. Preferably, a single end plate covers each side of the cam plate. A handle hole is preferably formed through each end plate to pivotally receive the driving handle. A cam spindle hole is formed through the two end plates to slidably receive the outer perimeter of the cam spindle. However, a mounting assembly may include a single end plate and the cam plate. The single end plate and the cam plate would be combined to form one combination end cam plate. A bolt head spacer includes a clearance opening for a head of the retention bolt.

Each mounting bracket includes a first mounting plate and a second mounting plate. One end of the first mounting plate is attached to one end of the second mounting plate. The mounting assembly may be inserted between the other ends of the first and second mounting plates. Preferably, two fasteners are inserted through a top of each mounting assembly, the bolt head spacer and a wall of the saddlebag and retained with a nut. Preferably, two fasteners are inserted through a bottom of each mounting assembly, the other end of the first mounting plate, the other end of the second mounting plate, and retained with a nut. The one end of the mounting bracket is also attached to the saddlebag. However, other fastening methods may also be used to attach the mounting assembly to the saddlebag. A second mounting assembly and mounting bracket are attached to the saddlebag adjacent the first mounting assembly and mounting bracket.

Each mounting bolt is preferably attached to a frame, fender strut or other mounting structure of a motorcycle. The two mounting bolts are located to be received by the cam spindle holes of the two mounting assemblies. To attach the saddlebag to the motorcycle, the cam in each mounting assembly is rotated such that the spindle clearance area is aligned with the cam spindle hole. The two mounting assemblies are placed over the two mounting bolts. Each driving handle is rotated until the cam is firmly engaged with the groove in each cam spindle.

Accordingly, it is an object of the present invention to provide a quick release saddlebag mounting system that may secure a saddlebag to a motor vehicle without rattling.

It is a further object of the present invention to provide a quick release saddlebag mounting system that allows a saddlebag to be locked to a motor vehicle to prevent theft.

It is yet a further object of the present invention to provide a quick release saddlebag mounting system that leaves the motor vehicle aesthetically clean.

Finally, it is another object of the present invention to provide a quick release saddlebag mounting system that allows a saddlebag to be removed from the motor vehicle without tools.

These and additional objects, advantages, features and benefits of the present invention will become apparent from the following specification.

DETAILED DESCRIPTION OF THE PREFERRED EMBODIMENTS

Figure 1:
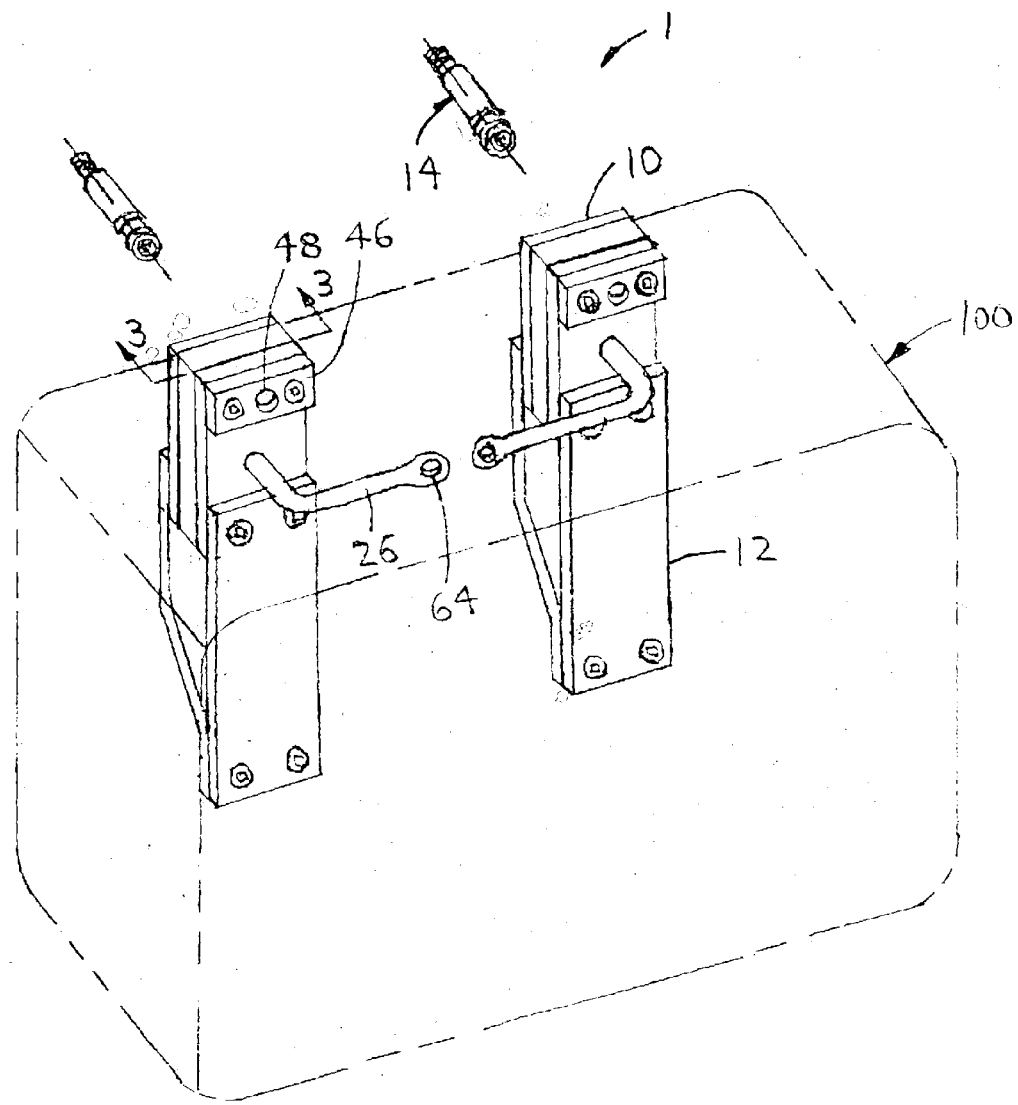
FIG. 1 is a perspective view of a quick release saddlebag mounting system attached to a saddlebag in accordance with the present invention.
Figure 2:
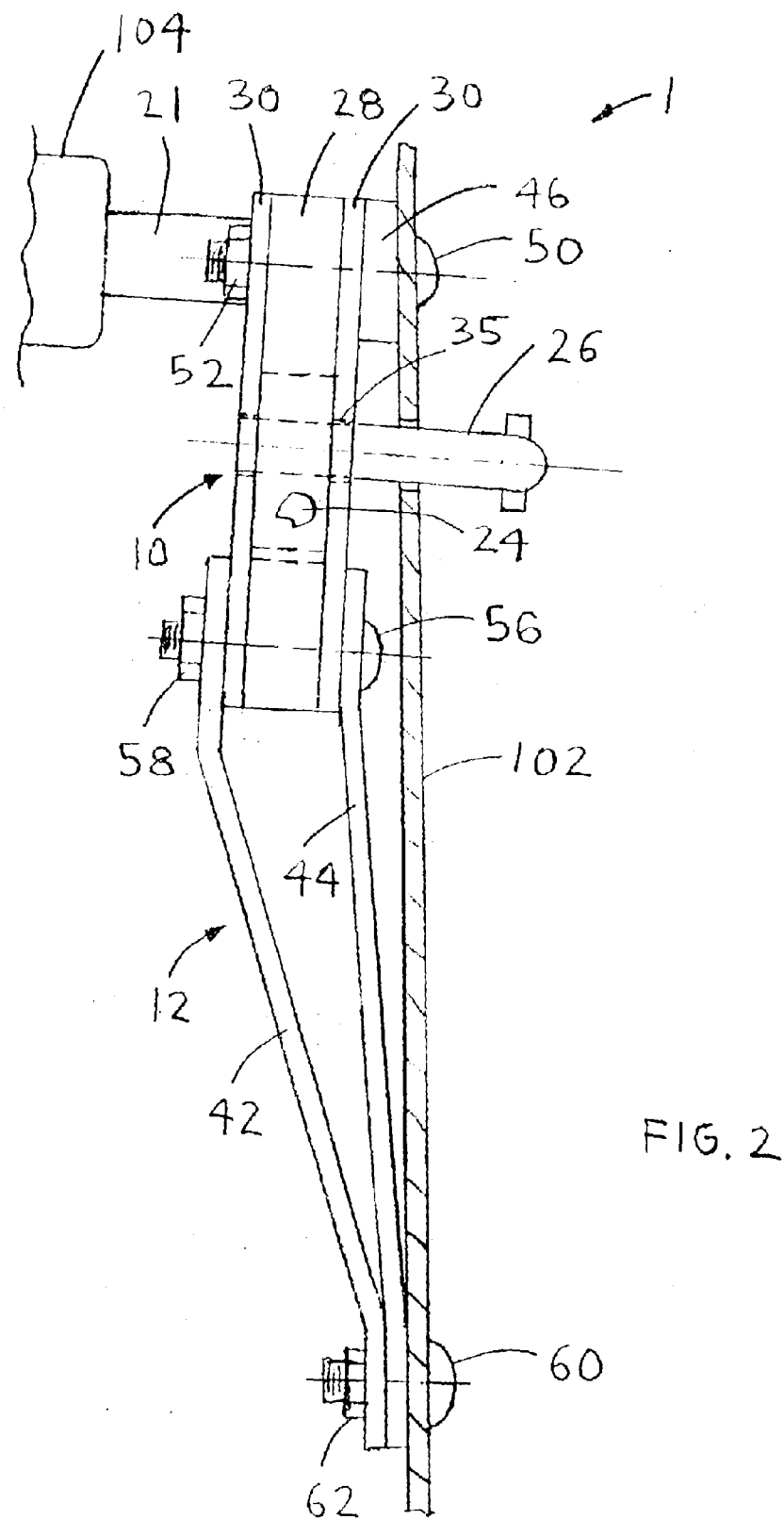
FIG. 2 is a side view of quick release saddlebag mounting system attached to a saddlebag and motorcycle in accordance with the present invention.
Figure 3:
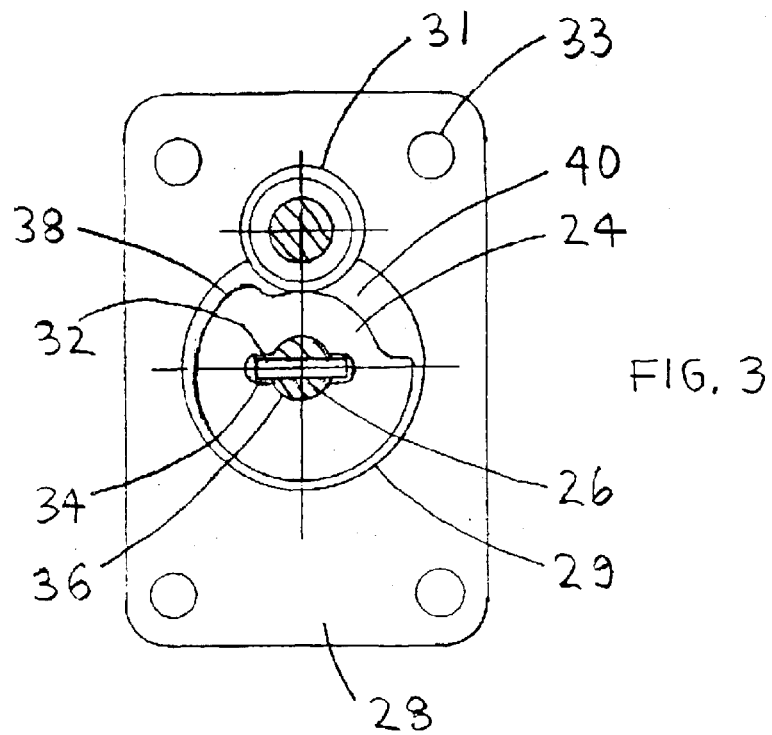
FIG. 3 is a front view of a mounting assembly with an end plate removed of a quick release saddlebag mounting system in accordance with the present invention.
Figure 4:
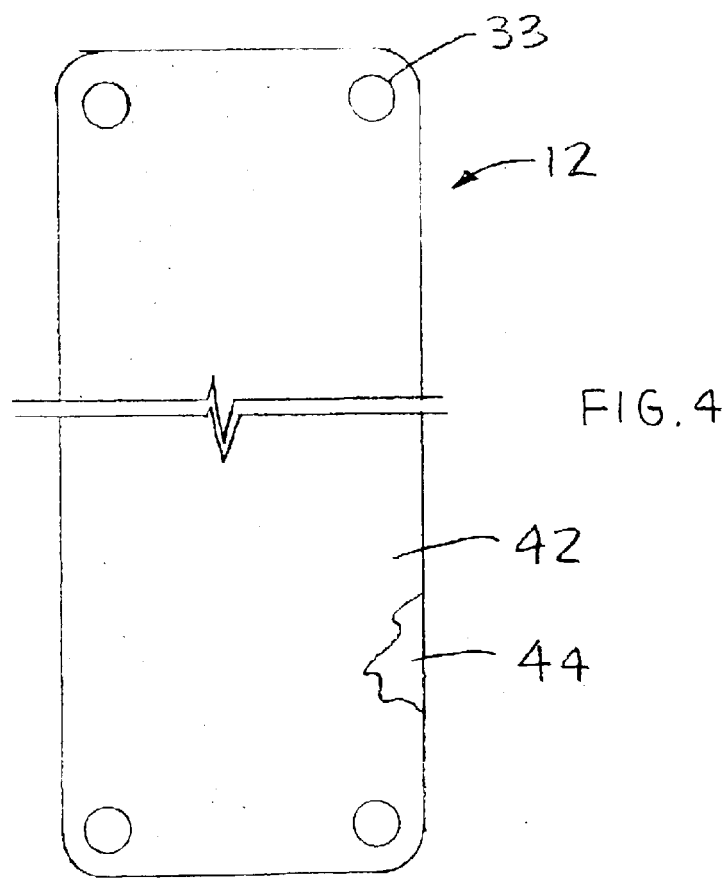
FIG. 4 is a front view of a mounting bracket of a quick release saddlebag mounting system in accordance with the present invention.
Figure 5:
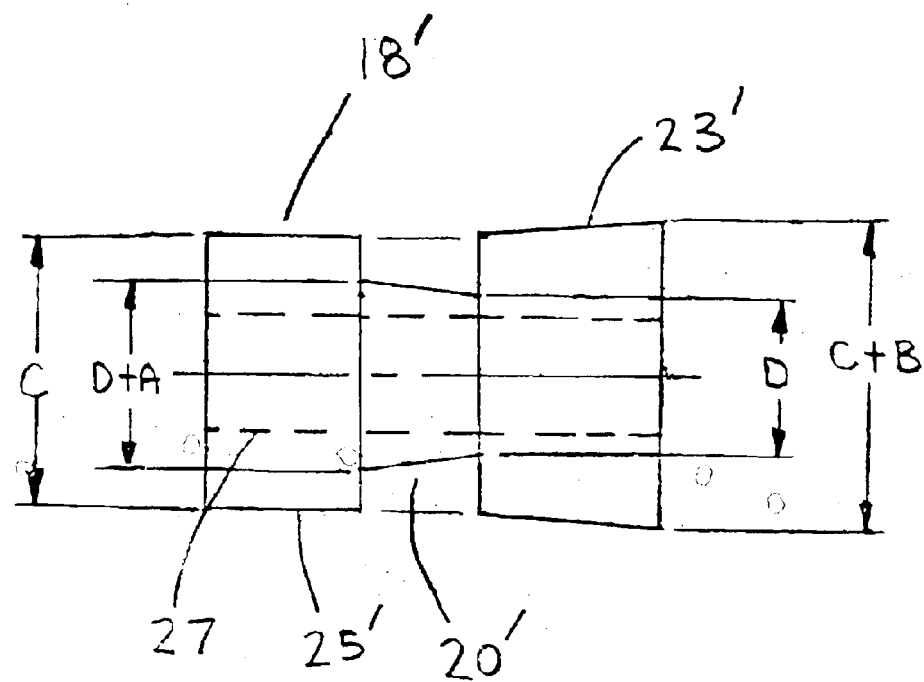
FIG. 5 is an enlarged side view of a cam spindle of a quick release saddlebag mounting system in accordance with the present invention.
Figure 6:
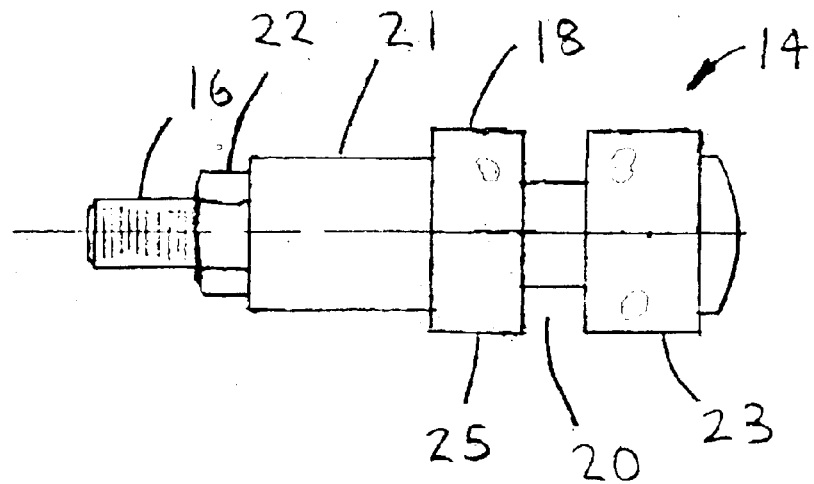
FIG. 6 is an enlarged side view of a mounting bolt of a quick release saddlebag mounting system in accordance with the present invention.

With reference now to the drawings, and particularly to FIG. 1, there is shown a perspective view of a quick release saddlebag mounting system 1. With reference to FIGS. 2–4, the quick release saddlebag mounting system 1 preferably includes two mounting assemblies 10, two mounting brackets 12 and two mounting bolts 14. With reference to FIG. 6, each mounting bolt 14 preferably includes a retention bolt 16, a cam spindle 18, a spacer 21 and a nut 22. The cam spindle 18 includes a groove 20, a first bearing surface 23, and a second bearing surface 25. With reference to FIG. 5, a bolt clearance hole 27 is formed through the cam spindle 18. The groove 20 receives a cam 24.

The cam spindle 18 is preferably modified by making one end of a diameter of the groove 20 larger in diameter than the other end by a dimension "A." The dimension "A" preferably has a value of between 0.01–0.02 inches, but other values may also be used. The dimension "A" causes the groove 20 to be angled relative to the centerline of the cam spindle 18 or to have a conical shape. The conical groove 20' improves the frictional contact with the cam 24. The first bearing surface 23 is also preferably modified by making one end of an outer diameter larger than the other end by a dimension "B". The dimension "B"[1] preferably has a value of between 0.02–0.04 inches, but other values may also be used. The dimension "B" causes the outer diameter of the first bearing surface 23 to be angled relative to the centerline thereof or to have a conical shape. The angle created by dimension "B" improves the frictional contact between the cam spindle 18 and the mounting assembly 10. The angle created by dimension "B" also compensates for sagging induced by the weight of the saddlebag 100.

Each mounting assembly 10 preferably includes the cam 24, a driving handle 26, a cam plate 28, and two end plates 30. The cam plate 28 includes a cam clearance opening 29, a cam spindle hole 31, and a plurality of fastener holes 33. Each end plate 30 includes the cam spindle hole 31, the plurality of fastener holes 33, and a handle clearance hole 35. The cam spindle hole 31 is formed through the cam plate 28 and the two end plates 30 to slidably receive the outer perimeter of the cam spindle 18. The handle clearance hole 35 is formed through each end plate 30 to pivotally receive the driving handle 26. However, each mounting assembly 10 may include a single end plate 30 and the cam plate 28. The single end plate 30 and the cam plate 28 would be combined to form one combination end cam plate. However, the driving handle 26 would only be supported on one side of the cam 24, not two as with two end plates.

The driving handle 26 is preferably attached to the cam 24 by pressing a dowel 32 through the cross section of the handle 26; forming at least one dowel slot 34 in the cam 24 to receive the dowel 32; and forming a handle hole 36 in the cam 24 to receive the handle 26. However, other assembly methods may also be used. A perimeter of the cams 24 includes an inclined surface 38 and a spindle clearance area 40. The following value is given by way of example and not by way of limitation. A rise value of 0.06 inches in 90 degrees on the included surface, has been found to provide satisfactory results for tightening the cam 24 in the groove 20, 20'. However, other values of rise may also be used. The spindle clearance area 40 of the cam 24 enables the groove 20 of the cam spindle 18 to be inserted into the cam plate 28 and aligned with a thickness of the cam 24.

Each mounting bracket 12 includes a first mounting plate 42 and a second mounting plate 44. One end of the first and second mounting plates are positioned against each other. The first and second mounting plates include a plurality of fastener holes 33.

Preferably, the other end of the first mounting plate 42 is bent outward from the other end of the second mounting plate 44 to allow a single mounting assembly 10 to be inserted therebetween. A bolt head spacer 46 includes two fastener holes 33 and a clearance opening 48 for a head of the retention bolt 16'.

Preferably, two fasteners 50 and two nuts 52 are used to attach a top of a single mounting assembly 10 and a single bolt head spacer 46 to a wall 102 of a saddlebag 100. Preferably, two fasteners 56 and two nuts 58 are used to attach a bottom of a single mounting assembly 10 to a top of a single mounting bracket 12. Preferably, two fasteners 60 and two nuts 62 are used to attach a bottom of a single mounting bracket 12 to the wall 102 of the saddlebag. However, other fastening methods may also be used to attach the mounting assembly 10 to the saddlebag 100. A second mounting assembly and mounting bracket are preferably attached to the saddlebag adjacent the first mounting assembly and mounting bracket.

Each mounting bolt 14 is preferably attached to a frame, fender strut or other mounting structure 104 of a motorcycle or some other motor vehicle. The two mounting bolts 14 are located to be received by the cam spindle holes 31 of the two mounting assemblies 10. To attach the saddlebag 100 to a motorcycle, the driving handle 26 of each mounting assembly 10 is rotated such that the spindle clearance area 40 is located adjacent the cam spindle hole 31. The cam spindle holes 31 in the two mounting assemblies 10 are aligned and pushed over the two cam spindles 18. Each driving handle 26 is rotated until the cam 24 is firmly engaged with the groove 20 in each cam spindle 18. A lock opening 64 is preferably formed through an end of each driving handle 26. A lock or lock and chain may be inserted through the lock openings 64 to prevent rotation of the driving handles 26 for unauthorized removal of the saddlebag 100. Both driving handles 26 are located inside the saddlebag 100.

While particular embodiments of the invention have been shown and described, it will be obvious to those skilled in the art that changes an modifications may be made without departing from the invention in it broader aspects, and therefore, the aim in the appended claims is to cover all such changes and modifications as fall within the true spirit and scope of the invention.

I claim:

1. A method of providing a quick release mounting capability to a saddlebag, comprising the steps of:

providing a cam having an inclined surface and a spindle clearance area;

attaching a cam spindle to a portion of a motor vehicle, said cam spindle having a groove;

retaining pivotally said cam in said saddlebag;

locating said cam spindle adjacent said spindle clearance area and aligning a thickness of said cam with said groove; and rotating said cam to engage said groove and secure said saddlebag to the motor vehicle.

2. The method of providing a quick release mounting capability to a saddlebag of claim 1, further comprising the step of:

attaching a handle to said cam.

3. The method of providing a quick release mounting capability to a saddlebag of claim 2, further comprising the step of:

retaining pivotally said handle in at least one plate.

4. The method of providing a quick release mounting capability to a saddlebag of claim 3, further comprising the step of:

securing said at least one plate to said saddlebag.

5. The method of providing a quick release mounting capability to a saddlebag of claim 1, further comprising the step of:

rotating said cam in a direction opposite that required to attach said saddlebag to remove said saddlebag from the motor vehicle.

6. The method of providing a quick release mounting capability to a saddlebag of claim 3, further comprising the step of:

providing a bracket that is attached to a bottom of said at least one plate, a top of said at least one plate being attached to said saddlebag, a bottom of said bracket being attached to said saddlebag.

7. The method of providing a quick release mounting capability to a saddlebag of claim 3, further comprising the step of:

inserting a spacer between said at least one plate and said saddlebag before attaching said at least one plate to said saddlebag.

8. The method of providing a quick release mounting capability to a saddlebag of claim 1, further comprising the step of:

forming said groove with a conical shape.

9. The method of providing a quick release mounting capability to a saddlebag of claim 1, further comprising the step of:

forming a conical shape on an outside diameter of said cam spindle.

10. The method of providing a quick release mounting capability to a saddlebag of claim 1, further comprising the step of:

forming a lock opening on an end of each said handle.

11. The method of providing a quick release mounting capability to a saddlebag of claim 3, further comprising the step of:

forming a cam spindle hole through said at least one plate, said cam spindle hole being located adjacent said cam, said cam spindle hole receiving said cam spindle.

12. A method of providing a quick release mounting capability to a saddlebag, comprising the steps of:

providing at least two cams each one having an inclined surface and a spindle clearance area;

retaining pivotally said at least two cams in at least two plates;

attaching at least two cam spindles to a portion of a motor vehicle, each one of said at least two cam spindles having a groove;

retaining pivotally said at least two plates in said saddlebag;

inserting each one of said at least two cam spindles adjacent said spindle clearance area and aligning a thickness of each one of said at least two cams with said groove; and rotating each one of said at least two cams to engage said groove and secure said saddlebag to the motor vehicle.

13. The method of providing a quick release mounting capability to a saddlebag of claim 12, further comprising the step of:

attaching a handle to each one of said at least two cams.

14. The method of providing a quick release mounting capability to a saddlebag of claim 12, further comprising the step of:

rotating each one of said at least two cams in a direction opposite that required to attach said saddlebag to remove said saddlebag from the motor vehicle.

15. The method of providing a quick release mounting capability to a saddlebag of claim 12, further comprising the step of:

providing a bracket that is attached to a bottom of each one of said at least two plates, a top of each one of said at least two plates being attached to said saddlebag, a bottom of said bracket being attached to said saddlebag.

16. The method of providing a quick release mounting capability to a saddlebag of claim 12, further comprising the step of:

inserting a spacer between each one of said at least two plates and said saddlebag before attaching said at least two plates to said saddlebag.

17. The method of providing a quick release mounting capability to a saddlebag of claim 12, further comprising the step of:

forming said groove with a conical shape.

18. The method of providing a quick release mounting capability to a saddlebag of claim 12, further comprising the step of:

forming a conical shape on an outside diameter of said cam spindle.

19. The method of providing a quick release mounting capability to a saddlebag of claim 12, further comprising the step of:

forming a lock opening on an end of each said handle.

20. The method of providing a quick release mounting capability to a saddlebag of claim 12, further comprising the step of:

forming a cam spindle hole through each one of said at least two plates, said cam spindle hole being located adjacent said cam, said cam spindle hole receiving said cam spindle.

* * * * *